DISTRIBUTION AMPLIFIER FOR ELECTRICAL SIGNALS
Filed March 22, 1963
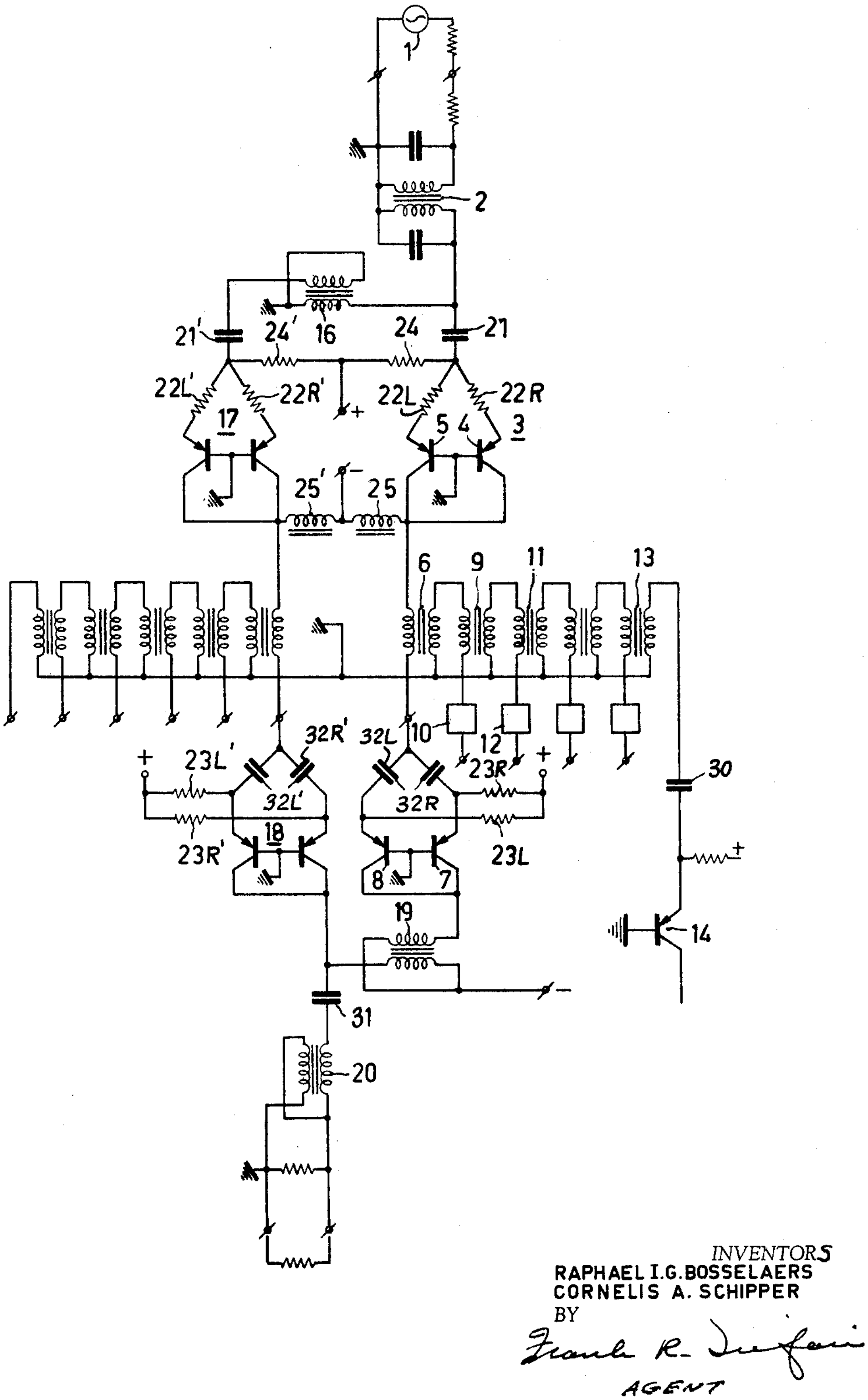
INVENTORS
RAPHAEL I.G. BOSSELAERS
CORNELIS A. SCHIPPER
BY
Frank R. Jerfani
AGENT

United States Patent Office 3,263,179

Patented July 26, 1966

3,263,179

DISTRIBUTION AMPLIFIER FOR ELECTRICAL SIGNALS

Raphael Isidoor Gabriel Bosselaers and Cornelis Arie Schipper, Hilversum, Netherlands, assignors to North American Philips Company, Inc., New York, N.Y., a corporation of Delaware Filed Mar. 22, 1963, Ser. No. 267,098

Claims priority, application Netherlands, May 11, 1962, 278,386

4 Claims. (Cl. 330—54)

The invention relates to a distribution amplifier for high-frequency electrical signals, particularly suitable for signals in wide frequency bands, which are encountered, for example in community antenna distribution systems. Such amplifiers may be employed for supplying a signal from a single community antenna to a plurality of different radio or television receivers. These receivers must be tunable to different stations without interfering with each other.

The requirements for the distribution amplifier are therefore:

(1) That signals in a wide frequency range for example from 1 to 30 mc./s. should be faithfully amplified.

(2) That there should be negligible interaction between the outputs and (3) That this process should be attended with a minimum amount of noise and intermodulation.

The invention has for its object to provide a transistorised amplifier of the kind set forth. It is characterized in that the signals are supplied via the primary winding of a first transformer having bifilar primary windings and secondary windings to the input electrode, preferably the emitter electrode of a first transistor, amplifier, which supplies a first output signal, while the secondary winding of the first transformer is in series with the primary winding of a second transformer also having bifilar windings which leads to the input electrode of a second transistor amplifier, which supplies a second output signal and so forth.

The invention is based on the recognition of the fact that in order to obtain low noise and intermodulation it is most advantageous to connect all transistor amplifiers with their input circuits in series with the signal source. To this end each transistor must be provided with a separation transformer, while the primary windings of these separation transformers must be connected in series with the signal source. From a technical point of view this has the disadvantage that the earth capacities of the transformer windings as well as their inductances may give rise to unwanted reflections of the signals to be transmitted.

The circuit according to invention employs transformers having bifilar windings, described in the article by Ruthroff in "Proc. I. R. E." of August 1959, pages 3137 and ff. By means of such a method of winding it is achieved that the signals which must pass a transformer are not reflected in an undesirable manner. Such transformers have the feature that they behave like an ideal transformer in series with a transmission line (Lecher line). Owing to their low-ohmic termination by means of the internal input impedance of the transistors it can be ensured that abrupt interruptions (dips) of the flat transmission characteristics curve due to reflection dampings for the travelling wave are avoided. Their main purpose, however, is to avoid undesirable increase in noise, which will be explained more fully hereinafter.

The invention will be described with reference to a drawing, which shows an embodiment of the invention.

As shown in the figure the signals to be amplified are fed from a source 1, for example a community antenna, via a matching conductor to a first transformer 2, preferably an annular core transformer. The output signals of the transformer 2 are fed to a first amplifier 3, which comprises two parallel-connected transistors 4 and 5 via a coupling capacitor 21 and resistors 22R and 22L. The common junction of resistors 22R and 22L is connected to a first bias voltage supply by a resistor 24 and the collectors to a second bias supply by a choke 25 while the bases are both grounded. The output signal current of the amplifier 3 is fed via the primary winding of a transformer 6 to the input electrode of parallel-connected transistors 7 and 8 by coupling capacitors 32R and 32L, respectively. Transistors 7 and 8 supply a first output signal for a first receiver. By the parallel combination of the transistors 4 and 5, and 7, 8 respectively it is ensured that the signal current is distributed among the two transistors, so that the distortion due to intermodulation is reduced. If transistors are available, which are capable of passing a high direct current, a single transistor in each stage will suffice. The emitters of transistors 7 and 8 are connected to a bias supply by resistors 23R and 23L, respectively.

The windings of the transformer 6 are arranged in a bifilar manner on an annular core as described in the aforesaid article of "Proc. I. R. E." By a correct choice of the sense of winding of the secondary winding of the transformer 6 it is ensured that the characteristic wave impedance of the transformer 6 for the output current of the amplifier 3 is very low, for example 5 to 20 ohms, whereas the impedances of the primary and the secondary windings of the transformer 6 which may be 100 μh. i.e. at the lowest signal frequency (1 mc./s.) are 600 ohms. Thus a reflection-free transmission of energy from the output of the amplifier 3 to the input of the amplifier 7, 8 is obtained, while at the same time part of the energy is diverted to the secondary winding of the transformer 6.

This secondary winding of the transformer 6 is in series with the primary winding of a similar annular-core transformer 9, provided with bifilar windings and with the input circuit of a transistor amplifier 10 which may be identical to the amplifier 7, 8. The transistor amplifier 10 constitutes a reflection-free termination for the transformer 9 and again part of the signal energy is derived from the secondary winding of the transformer 9. This secondary winding leads via the primary winding of a similar further transformer 11 to the input of a further amplifying stage. Finally the secondary winding of the last of these transformers 13 is connected to the input circuit of a transistor amplifier 14, the output of which is connected to the last of the receivers to be fed.

The invention is based on the recognition of the fact that by including transverse resistors in the common collector circuit of the transistors 4 and 5 the noise and the intermodulation are only raised. It is therefore desirable to form the impedance operative across said collector circuit mainly by the input impedance of the successive buffer amplifiers 7, 8, 10, 12, 14. If these amplifiers were included, if desired via matching transformers, parallel to each other in the said collector circuit, the input noise and the intermodulation of each buffer amplifier would increase owing to the low input impedances of the other buffer amplifiers operating in parallel therewith. Therefore, all input circuits of the buffer amplifiers are connected effectively (via transformers 6, 9, 11, 13) in series in the common collector circuit of the transistors 4, 5.

Said transformers must exhibit a wide pass band characteristic, but should not exhibit, viewed from the emitters of the buffer amplifiers 7, 8, 10, 12, 14 undesirable series resonances to earth. Viewed from said emitters, the common collector circuit of the transistors 4, 5 constitutes a current source having a high internal resistance, which is considerably higher than the optimum resistance (for example 200 ohms) desirable for a minimum amount of noise (for example 1.6 db). However, the resultant increase in noise is low (for example 0.2 db) as compared with the increase in noise (for example a few db) if the emitter input circuits of the transistors 7 and 8 should become low ohmic (for example a few tens of ohms) due to an (undesirable) series resonance. The same applies to the intermodulator. Owing to the specific construction of the transformer 6 as an annular-core transformer with bifilar windings this series resonance is avoided. Such a construction is not required for the transformer 2, since both on the primary and on the secondary side the load is such that no undesirable resonance phenomena will occur, which might result in such an undesirable increase in noise.

The ground-connecting point of the secondary windings of the transformers 6, 9, 11, 13 is chosen so (in contrast to the aforesaid article in "Proc. I. R. E.") that all transformers exhibit the same characteristic impedance for the passing waves. For this purpose the ends of the secondary windings which are nearest the ends of the primary windings connected to the emitters of the further amplifiers 7, 8, 10, 12, 14 are connected to earth.

For balancing purposes the output of the transformer 2 includes an inverting transformer 16, which supplies a signal in phase opposition to the input of an amplifier 17, which is otherwise similar to the amplifier 3 the same reference numerals with prime designations being used. The output of the amplifier 17 again leads via the primary winding of a transformer with bifilar windings, similar to the transformers 6, 9 and so on to the input of a transistor amplifier 18, which is similar to the transistor amplifier 7, 8. The outputs of said amplifiers are combined by means of a push-pull inverting transformer 19, the signals being then supplied via a coupling capacitor 31 and an impedance transformer 20 to the input circuit of the receiver to be connected. The inverting transformers 16 and 19 and the impedance transformer 20 are also formed by annular-core transformers with bifilar windings as described in the said article in "Proc. I.R.E." The last-mentioned transformer raises the signal current which becomes available for the receiver and hence the amplification factor of the whole system.

In a practical embodiment of the distribution amplifier for 1 to 30 mc./s., transistors of the type AFZ 12 were employed. The transformer 2 was an annular-core transformer which comprised, with a view to an optimum noise adaption, on the primary side nine turns and on the secondary side six turns. The core material was Ferroxcube 3E. For the transformers 16, 19 and 20 were used annular-core transformers having bifilar primary and secondary windings of 22 turns each. The core material was again Ferroxcube 3E. For the transformers 6, 9 and so on annular-core transformers were used having bifilar windings of 15 turns each. The core material was Ferroxcube 3H1. In all cases the core dimensions of the transformers were: outer diameter 6 mms., inner diameter 4 mms., height 2 mms. The capacitors 21, 30, 31 and 32 were all blocking capacitors of 39,000 pf. The emitter resistors 22 were all 120 ohms. The emitter resistors 23 had a value of 2700 ohms. Resistors 24 had a value of 1200 ohms. Chokes 25 had a value of 1 mh. Transformer 2 was shunted by a capacitor of 15 pf. on the primary side and a capacitor of 47 pf. on the secondary side. The amplification attained was about 3 db.

In principle it is possible to drive the transistors also in grounded emitter connection, in which case, however, a higher intermodulation of the antenna signals and a lower cut-off frequency of the transistors must be considered. The antenna signals may also be fed to the inputs of the stages 3, 17 etc. via a superheterodyne stage, in which case for example a band of lower mean frequency but larger relative bandwidth must be provided for.

What is claimed is:

1. A distribution amplifier suitable for use in a community antenna distribution system comprising a source of signals, a plurality of amplifiers each having input, output and reference terminals, a plurality of transformers each having bifilar wound primary and secondary windings, means connecting one of said primary windings between said source of signals and the input terminal of one of said amplifiers, means connecting one end of each of the remaining primary windings to the input terminal of a different amplifier and the other end to one end of a different secondary winding, means connecting the other end of the secondary windings and the reference terminal of each of said plurality of amplifiers to a point of reference potential, and means connected to the remaining end of the remaining secondary winding for providing a reflection free termination thereof.

2. A distribution amplifier as set forth in claim 1 in which the number of said plurality of amplifiers exceeds the number of transformers by one and said last named means includes means connecting one of said amplifiers to said remaining secondary winding.

3. A distribution amplifier suitable for use in a community antenna distribution system comprising a source of signals, a plurality of amplifiers each having input, output and reference terminals, a plurality of pairs of transformers each pair having first and second bifilar wound primary and secondary windings, first means connecting the first primary winding of one pair of said pairs of transformers between said signal source and the input terminal of one of said amplifiers, second means connecting the second primary winding of said pair between the input terminal of a second amplifier and the said signal source, said second means reversing the phase of the signal from said source with respect to said first means, third means connecting one end of each of the remaining primary windings to one end of a different secondary winding and the other end of each of the remaining primary windings to the input terminal of a different amplifier, fourth means connecting the other end of the secondary windings to a point of reference potential, load means, fifth means connecting the reference terminal of said amplifiers to said point of reference potential, sixth means connecting the outputs of those pairs of amplifiers connected to the first and second primary windings of a pair of transformers to said load means, and means connected to the remaining ends of the remaining secondary windings for providing reflection free termination thereof.

4. A distribution amplifier as set forth in claim 3 in which the number of said plurality of amplifiers exceeds the number of transformers by two and said last named means includes means connecting both of said amplifiers to the first and second of said remaining secondary windings of the same pair of transformers respectively.

References Cited by the Examiner

UNITED STATES PATENTS

| | | | |
|---|---|---|---|
| 2,942,199 | 6/1960 | Lee | 330—54 X |
| 2,957,143 | 10/1960 | Enloe | 330—54 X |
| 3,097,343 | 7/1963 | Sosin et al. | 330—54 X |

ROY LAKE, *Primary Examiner.*

N. KAUFMAN, *Assistant Examiner.*